(12) United States Patent
Tang et al.

(10) Patent No.: US 11,234,448 B1
(45) Date of Patent: Feb. 1, 2022

(54) HIGH WATER ACTIVITY CONFECTIONERY PRODUCT AND PROCESS OF MAKING SAME

(71) Applicant: THE HERSHEY COMPANY, Hershey, PA (US)

(72) Inventors: Dongming Tang, Hummelstown, PA (US); Brian Scott Baker, Millersburg, PA (US); Burton Douglas Brown, Hershey, PA (US)

(73) Assignee: THE HERSHEY COMPANY, Hershey, PA (US)

( * ) Notice: Subject to any disclaimer, the term of this patent is extended or adjusted under 35 U.S.C. 154(b) by 50 days.

(21) Appl. No.: 16/124,403

(22) Filed: Sep. 7, 2018

Related U.S. Application Data

(60) Provisional application No. 62/555,770, filed on Sep. 8, 2017.

(51) Int. Cl.
| | | |
|---|---|---|
| *A23G 1/42* | (2006.01) | |
| *A23G 1/36* | (2006.01) | |
| *A23L 3/3463* | (2006.01) | |
| *A23G 1/46* | (2006.01) | |
| *A23G 1/40* | (2006.01) | |

(52) U.S. Cl.
CPC ............. *A23G 1/426* (2013.01); *A23G 1/36* (2013.01); *A23G 1/40* (2013.01); *A23G 1/423* (2013.01); *A23G 1/46* (2013.01); *A23L 3/34635* (2013.01)

(58) Field of Classification Search
USPC ........................................................ 426/532
See application file for complete search history.

(56) References Cited

U.S. PATENT DOCUMENTS

| | | | |
|---|---|---|---|
| 4,056,640 A | 11/1977 | Otto | |
| 4,450,179 A | 5/1984 | Vink et al. | |
| 4,666,730 A | 5/1987 | Mergelsberg | |
| 4,902,527 A | 2/1990 | Galenkamp et al. | |
| 4,963,359 A | 10/1990 | Haslwanter et al. | |
| 4,992,290 A | 2/1991 | Bastetti et al. | |
| 5,104,680 A | 4/1992 | Padley et al. | |
| 5,384,148 A | 1/1995 | Lynch et al. | |
| 5,626,902 A | 5/1997 | Kuramori et al. | |
| 5,659,000 A | 8/1997 | Cain et al. | |
| 5,711,984 A | 1/1998 | Woodward et al. | |
| 5,962,061 A | 10/1999 | Ter Braak | |
| 6,517,886 B1 | 2/2003 | Chau et al. | |
| 6,673,380 B2 | 1/2004 | Yang et al. | |
| 6,824,808 B2 | 11/2004 | Best et al. | |
| 7,198,812 B2 | 4/2007 | Forte et al. | |
| 7,229,657 B2 | 6/2007 | Woelfel et al. | |
| 2003/0031771 A1 | 2/2003 | Woelfel et al. | |
| 2003/0049361 A1 | 3/2003 | Forte et al. | |
| 2003/0124243 A1 | 7/2003 | Cotten et al. | |
| 2003/0152678 A1 | 8/2003 | Rabinovitch et al. | |
| 2004/0253560 A1 | 12/2004 | Markwardt et al. | |
| 2005/0089618 A1 | 4/2005 | Bernard et al. | |
| 2006/0121164 A1 | 6/2006 | Hanselmann | |
| 2006/0182847 A1 | 8/2006 | Geltmeyer | |
| 2007/0048431 A1 | 3/2007 | Budwig et al. | |
| 2008/0050484 A1 | 2/2008 | Kijowski et al. | |
| 2008/0206426 A1 | 8/2008 | Rousset et al. | |
| 2008/0241335 A1 | 10/2008 | Rey et al. | |
| 2009/0020566 A1 | 1/2009 | Abylov et al. | |
| 2010/0159068 A1 | 6/2010 | Wittorff et al. | |
| 2011/0165293 A1 | 7/2011 | Willibald-Ettle et al. | |
| 2011/0177174 A1 | 7/2011 | Crowley et al. | |
| 2011/0217423 A1 | 9/2011 | Vaman et al. | |
| 2011/0217427 A1 | 9/2011 | Vaman et al. | |
| 2011/0244082 A1 | 10/2011 | Vaman et al. | |
| 2011/0288182 A1 | 11/2011 | Ervin et al. | |
| 2012/0071567 A1 | 3/2012 | Crowley et al. | |
| 2013/0202735 A1 | 8/2013 | Topsoe et al. | |

(Continued)

FOREIGN PATENT DOCUMENTS

| | | |
|---|---|---|
| BR | 102013028990 A2 | 10/2015 |
| BR | 102014015938 A2 | 2/2016 |

(Continued)

OTHER PUBLICATIONS

Minifie "Chocolate, Cocoa, and Confectionery 3rd Edition" Chapman and Hall 1989 pp. 530-541 (Year: 1989).*

(Continued)

*Primary Examiner* — Jyoti Chawla

(74) *Attorney, Agent, or Firm* — McNees Wallace & Nurick LLC

(57) ABSTRACT

A process of forming a confectionery product includes heating a confectionery mixture comprising a sweetened milk product and fat while stirring until the confectionery mixture reaches a predetermined consistency. The process also includes forming the confectionery product upon cooling of the confectionery mixture. The confectionery product has a water activity of about 0.59 or greater, has a sugar content of about 87 degrees Brix or less, and has a shelf life of about three months or greater. A confectionery product includes a confectionery mixture. The confectionery product includes a sweetened milk product, butter, cocoa powder, a sweetener, and a preservative. The sweetener is corn syrup, inulin, tapioca syrup, maltodextrin, pear puree, and/or a combination thereof. The confectionery mixture has a water activity of about 0.59 or greater, has a sugar content of about 87 degrees Brix or less, and has a shelf life of about three months or greater.

18 Claims, 1 Drawing Sheet

(56) References Cited

U.S. PATENT DOCUMENTS

| | | | |
|---|---|---|---|
| 2013/0209645 | A1 | 8/2013 | De Lobel et al. |
| 2014/0030410 | A1 | 1/2014 | Hochapfel et al. |
| 2014/0113049 | A1 | 4/2014 | Loeser et al. |
| 2014/0220188 | A1 | 8/2014 | Srnak et al. |
| 2014/0234492 | A1 | 8/2014 | Matsuura et al. |
| 2014/0295034 | A1 | 10/2014 | Bousselet-Kilger et al. |
| 2014/0302220 | A1 | 10/2014 | Vieira et al. |
| 2014/0322419 | A1 | 10/2014 | De Lobel et al. |
| 2015/0017279 | A1 | 1/2015 | Kearsley |
| 2015/0056357 | A1 | 2/2015 | Bhaggan et al. |
| 2015/0313252 | A1 | 11/2015 | Stolpe et al. |
| 2015/0313253 | A1 | 11/2015 | Slager |
| 2015/0374008 | A1 | 12/2015 | Avalov |

FOREIGN PATENT DOCUMENTS

| | | | |
|---|---|---|---|
| BR | 102014015939 | A2 | 2/2016 |
| BR | 102014015942 | A2 | 2/2016 |
| BR | 102014015946 | A2 | 2/2016 |
| PL | 411060 | A1 * | 8/2016 |
| SU | 833188 | A1 | 5/1981 |
| WO | 2006127604 | A2 | 11/2006 |

OTHER PUBLICATIONS

Wills "Water Activity and its Importance in Making Candy" The Manufacturing Confectioner Aug. 1998, pp. 71-74 (Year: 1998).*
The Fudgery "FAQs" pp. 1-3 May 2016 http://web.archive.org/web/20160518010419/https://thefudgery.ca/html/faqs.html (Year: 2016).*

* cited by examiner

HIGH WATER ACTIVITY CONFECTIONERY PRODUCT AND PROCESS OF MAKING SAME

CROSS-REFERENCE TO RELATED APPLICATIONS

This application claims priority to and the benefit of U.S. Provisional Application No. 62/555,770 filed Sep. 8, 2017, which is hereby incorporated by reference in its entirety.

FIELD OF THE INVENTION

This application is directed to high water activity confectionery products and processes of making the same. More particularly, the present invention is directed to high water activity confectionery products with an extended shelf life.

BACKGROUND OF THE INVENTION

Many high water activity confectionery products have a short shelf life, making it difficult to provide them for mass commercial sale.

One such high water activity confectionery product is a confection that originated in Brazil and is commonly referred to as brigadeiro. Brigadeiro is made by heating a mixture of sweetened condensed milk, cocoa powder, and butter. In a conventional process, 14 ounces of a conventional, commercially-available sweetened condensed milk, three tablespoons of cocoa powder, and one tablespoon of butter are combined and mixed, and the mixture is then cooked for about ten minutes. The resulting product is typically formed into balls upon cooling. The balls are often coated by solid bits, such as, for example, sprinkles, especially chocolate sprinkles, or chopped nuts. The product is typically eaten while still warm but may alternatively be refrigerated and served cold or chilled.

Brigadeiro has a shelf life of only about a week at ambient conditions. After a week at ambient conditions, the texture of brigadeiro begins to become sandy and grainy, and the surface becomes hard and dry. After about two to three weeks at ambient conditions, mold may start to grow on the surface of the brigadeiro.

It would be desirable to provide a shelf-stable high water activity confectionery product.

BRIEF DESCRIPTION OF THE INVENTION

Exemplary embodiments are directed to shelf-stable high water activity confectionery products.

Exemplary embodiments employ processes of forming shelf-stable high water activity confectionery products.

In an embodiment, a process of making a shelf-stable high water activity confectionery product includes heating a confectionery mixture including a sweetened milk product and fat while stirring until the confectionery mixture reaches a predetermined consistency. The process also includes forming the confectionery product upon cooling of the confectionery mixture. The confectionery product has a water activity of about 0.59 or greater, has a sugar content of about 87 degrees Brix or less, and has a shelf life of about three months or greater.

In another embodiment, a confectionery product includes a confectionery mixture. The confectionery product includes a sweetened milk product, butter, cocoa powder, a sweetener selected from the group consisting of corn syrup, inulin, tapioca syrup, maltodextrin, pear puree, and combinations thereof, and a preservative. The confectionery mixture has a water activity of about 0.59 or greater, has a sugar content of about 87 degrees Brix or less, and has a shelf life of about three months or greater.

Other features and advantages of the present invention will be apparent from the following more detailed description of exemplary embodiments that illustrate, by way of example, the principles of the invention.

DETAILED DESCRIPTION OF EXEMPLARY EMBODIMENTS

Figure 1:
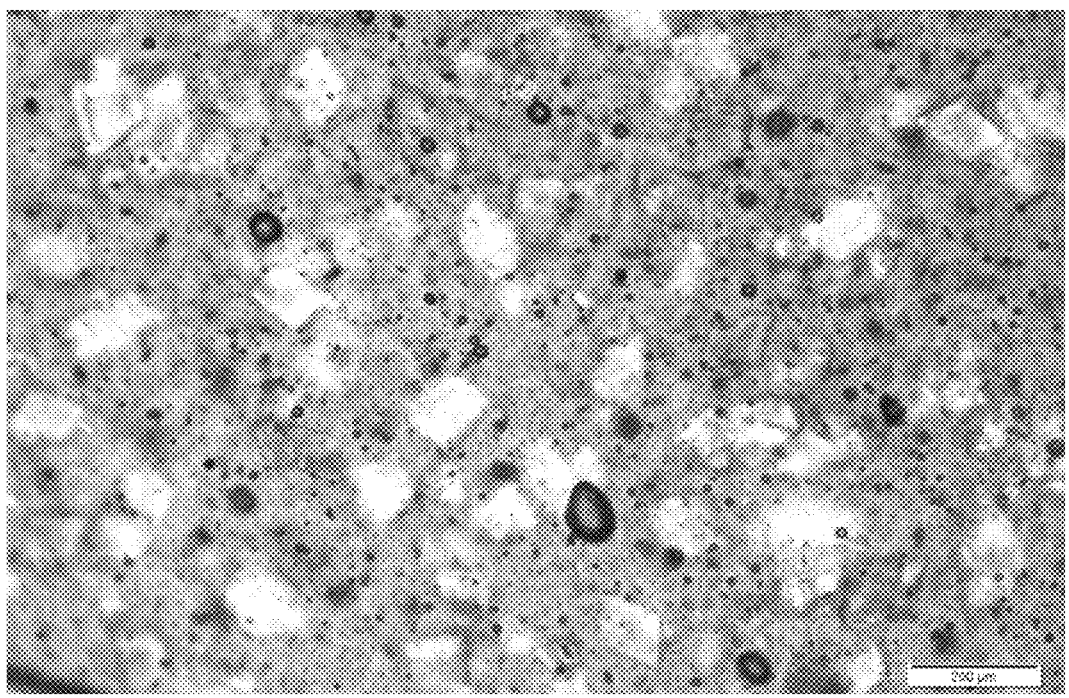
FIG. 1 shows an image of a sample of the Comparative Example at three weeks after formation.

A high water activity confectionery food product has an extended shelf life based on one or more of the following measures being taken during production of the high water activity confectionery food product: hydrolysis of lactose in the milk product by a lactase enzyme, use of evaporated milk rather than sweetened condensed milk as the milk product, use of corn syrup, sucrose, and/or invert sugar as the sweetener for the evaporated milk, addition of glycerol and/or corn syrup before the cooking of the initial ingredients, use of a preservative, and application of an edible film to the outer surface of the high water activity confectionery food product.

Among the advantages of certain exemplary embodiments is that the high water activity confectionery product is shelf stable, the high water activity confectionery product has a shelf life of at least three months, the high water activity confectionery product has a shelf life of at least six months, the high water activity confectionery product has a shelf life of at least nine months, the high water activity confectionery product maintains a creamy texture for at least three months without refrigeration, the high water activity confectionery product maintains a creamy texture for at least six months without refrigeration, the high water activity confectionery product maintains a creamy texture for at least nine months without refrigeration, or combinations thereof.

As used herein, "shelf-stable" refers to any food product having an unrefrigerated shelf life of at least three months without a noticeable change in taste or texture, including, for example, visible mold growth.

As used herein, "high water activity" refers to a water activity of about 0.59 or higher.

As used herein, "clean label" refers to any food product or ingredient containing no artificial ingredients or synthetic chemicals.

As used herein, a "milk product" refers to any liquid product of cow's milk having a reduced water content relative to cow's milk.

As used herein, "evaporated milk" refers to a shelf-stable product of milk with about 60% of the water removed followed by homogenization and heat-sterilization without the addition of sugar or other sweeteners. In some embodiments, the milk is cow's milk.

As used herein, "sweetened condensed milk" refers to a product of milk with sweetener added and with a portion of the water removed. In some embodiments, the milk is cow's milk. Conventional, commercially-available sweetened condensed milk is a shelf-stable product of cow's milk typically with about 27 grams of fat, about 166 grams of sugar, and about 24 grams of protein per cup (about 306 grams) and with sucrose as the added sweetener. In some embodiments, a sweetened milk product is a sweetened condensed milk that may differ in composition to a conventional commercially-available sweetened condensed milk, such as, for example, by having a reduced lactose content, by including one or more sweeteners other than lactose and sucrose, by having a higher or lower sweetener content, or by having a higher or lower water content, as described herein.

A shelf-stable high water activity confectionery product includes a sweetened milk product, fat, a liquid sweetener, and glycerol or other humectant, optionally flavoring(s), preservative(s) and/or other additives and may include a coating applied to the outer surface of the confectionery product. The confectionery product preferably has a water activity of about 0.59 or greater, has a sugar content of about 87 degrees Brix or less, and has a shelf life of about three months or greater. In some embodiments, the sugar content is in the range of about 75 to about 87 degrees Brix, alternatively in the range of about 80 to about 85 degrees Brix, or any value, range, or sub-range therebetween.

In some embodiments, the sweetened milk product has a reduced lactose content or is lactose-free or substantially lactose-free. In some embodiments, the sweetened milk product is sweetened condensed milk having a lactose content reduced by a lactase. In some embodiments, the sweetened milk product is an evaporated milk having a lactose content reduced by a lactase combined with at least one sweetener. In some embodiments the sweetened milk product is a reduced-lactose or lactose-free milk powder combined with water and at least one sweetener. In some embodiments, the lactose reduction is at least 75% compared to the original amount of lactose present, alternatively at least about 80%, alternatively at least about 90%, alternatively at least about 99%.

The sweetener used in forming the sweetened milk product may include, but is not limited to, corn syrup, sucrose, invert sugar, inulin, tapioca syrup, agave syrup, rice syrup, or combinations thereof. In some embodiments, the corn syrup has a dextrose equivalent of about 42. Depending on the water content in the milk at the time of addition of the sweetener, the amount of added sweetener may be in the range of about 10-50% by weight, alternatively about 15-45% by weight, alternatively about 25-40% by weight, or any value, range, or sub-range therebetween. In some embodiments, the sweetener is added to evaporated milk in an amount in the range of about 25-30% by weight, alternatively about 28% by weight, or any value, range, or sub-range therebetween. In some embodiments, the sweetener in the sweetened milk product is present in an amount in the range of about 40-50% by weight, alternatively in the range of about 40-45% by weight, alternatively in the range of about 45-50% by weight, or any value, range, or sub-range therebetween, prior to combining the sweetened milk product with a fat and any additional ingredients to form a confectionery mixture.

The water content of the sweetened milk product is then further reduced to between about 70% and about 90% by weight solids, such as, for example, between about 72% to about 86% by weight solids or between about 81% and about 85% by weight solids.

The resulting sweetened milk product has lower sucrose and lactose levels than conventional, commercially-available sweetened condensed milk. This in turn, helps avoid crystallization in the subsequently-formed confectionery product.

The thus-formed sweetened milk product with its high solids amount is thereafter combined with the other ingredients in forming the confectionery. The fat used may be any fat having an appropriate hardness and consistency, including, but not limited to, butter, a shortening, a vegetable fat, an animal fat, a blend of solid fats and oils, or combinations thereof. In some embodiments, the fat is a dairy fat such as butter or other milk fat (e.g., anhydrous milk fat) and the butter may be salted or unsalted butter. In some embodiments, the butter or other added fats (i.e., in addition to any fat introduced via the sweetened milk product) are present in the pre-cooked confectionery mixture in an amount in the range of about 4-16% by weight, alternatively in the range of about 4-6% by weight, alternatively in the range of about 8-12% by weight, alternatively in the range of about 14-16% by weight, or any value, range, or sub-range therebetween.

A liquid sweetener in the form of syrup may be added to the pre-cooked confectionery mixture. Any syrup that adds sweetener to the confectionery may be employed, although corn syrup, inulin, or both may be preferred in some embodiments. The amount of syrup introduced may be in an amount in the range of about 15% to about 40% by weight, such as about 20% to about 35% by weight in the pre-cooked confectionery mixture. A humectant such as glycerol may also be optionally introduced into the pre-cooked confectionery mixture and aids in controlling the water activity of the finished product. In some embodiments, the humectant is present in an amount of up to about 6% by weight, alternatively about 1% to about 6%, alternatively about 1% to about 3%, or any value, range, or sub-range therebetween. Other additives may include, but are not limited to, maltodextrin, milk protein isolate, sodium caseinate, anhydrous milk fat, any vegetable protein, including, but not limited to, whey protein or soy protein, a starch, a modified starch, a gum, carrageenan, pectin, a hydrocolloid, a gelling agent, gelatin, or combinations thereof. In some embodiments, the total amount of non-flavor additives, including liquid sweetener and humectant, are present in the pre-cooked mixture in an amount up to about 30% by weight, alternatively in the range of about 20-30% by weight, alternatively up to about 28% by weight, alternatively in the range of about 22-28% by weight, alternatively in the range of about 24-28% by weight, or any value, range, or sub-range therebetween.

In preferred embodiments, the confectionery also includes one or more flavoring additives that may include, but are not limited to, cocoa powder, fruit puree, pear puree, mango puree, peanut butter, peanut flour, chocolate, or combinations thereof. In some embodiments, the flavoring is present in the pre-cooked mixture in an amount up to about 16% by weight, alternatively in the range of about 2-16% by weight, alternatively up to about 10% by weight, alternatively in the range of about 2-10% by weight, alternatively up to about 5% by weight, alternatively in the range of about 2-5% by weight, or any value, range, or sub-range therebetween. Additionally, water may be added prior to cooking to aid in the mixing process.

In exemplary embodiments, a preservative is also included to help with shelf-stability of the finished product. In some embodiments, the preservative is a clean label preservative. In some embodiments, the preservative is an anti-gram-negative bacteria, anti-yeast, anti-mold, cultured skim milk-based clean label preservative, such as, for example, the clean label preservative marketed under the name MicroGARD® 100 (Dupont Nutrition Biosciences APS Company, Copenhagen, Denmark). In some embodiments, the preservative is an anti-gram-negative bacteria, anti-yeast, anti-mold clean label preservative, such as, for example, the clean label preservative marketed under the name MicroGARD® 200 (Dupont Nutrition Biosciences APS Company). In some embodiments, the preservative is present with respect to the pre-cooked mixture in an amount up to about 2% by weight, alternatively in the range of about 1-2% by weight, or any value, range, or sub-range therebetween. In some embodiments, the preservative is dissolved in water at about 15-25% by weight, alternatively in the range of about 17-21% by weight, or any value, range, or sub-range therebetween.

The coating may include, but is not limited to, an edible film, solid bits, or a combination thereof. The edible film may be fat-based or oil-based. In some embodiments, the edible film is an anti-sticking agent, such as, for example, the anti-sticking agent marketed under the name Capol® 570C (Capol GmbH, Elmshorn, Germany). In some embodiments, the edible film is a dispersion of beeswax in palm oil. The solid bits may include, but are not limited to, granulated sugar, sprinkles, chopped nuts, or combinations thereof.

In some embodiments, a process of making a shelf-stable high water activity confectionery product includes combining fat, a humectant, and at least one flavoring with a sweetened milk product and mixing and cooking the mixture to a predetermined thickened consistency. In some embodiments, the sweetened milk product is a reduced-lactose sweetened milk product. In some embodiments, the process includes combining a preservative dissolved in a small amount of water with the cooked mixture. In some embodiments, the cooked mixture is allowed to cool and is formed into balls. In some embodiments, a coating is applied to the outer surface of the balls to form the shelf-stable high water activity confectionery product.

In some embodiments, the sweetened milk product is made by adding a lactase enzyme to evaporated milk to form a reduced-lactose milk product and adding at least one sweetener to the reduced-lactose milk product to form the sweetened milk product. In some embodiments, the process further includes reducing the water content of the sweetened milk product prior to mixing with the other confectionery product ingredients.

In some embodiments, the shelf-stable high water activity confectionery product has a maximum force in the range of about 600 g to about 800 g and a minimum force in the range of about −300 g to about −500 g using a model TA-XT2 texture analyzer. In some embodiments, the shelf-stable high water activity confectionery product sticks to the analyzer probe during retraction such that the force has a measurable negative value for at least a certain distance after the probe tip is retracted above the surface level of the shelf-stable high water activity confectionery product prior to returning to a zero value.

EXAMPLES

The invention is further described in the context of the following examples, which are presented by way of illustration, not of limitation.

Comparative Example

A commercially-available sweetened condensed milk, butter, and cocoa powder were combined in the amounts listed in Table 1. The mixture was heated to a simmer and was simmered with stirring for at least 10 minutes until a measured sugar content of about 81 to about 85 degrees Brix was reached. The resulting product was removed from the heat and formed into balls as a Comparative Example (CE).

TABLE 1

Comparative Example Ingredients

| Ingredient | wt % |
|---|---|
| Sweetened condensed milk | 87.8 |
| Butter | 6.6 |
| Cocoa powder | 5.5 |

Samples of the Comparative Example were stored at room temperature for up to three weeks. The Comparative Example had a shelf life of less than a week. After one to two weeks, the surface of the Comparative Example was hard and dry. After two to three weeks, the Comparative Example had a sandy, grainy texture, with growth of some mold being detected. At three weeks, the Comparative Example was imaged under 10× magnification and contained relatively large crystals (about 100 microns in size) in the sample, as shown in FIG. 1.

Inventive Example 1

A reduced-lactose evaporated milk was prepared by combining about 0.4 wt % of a lactase enzyme with evaporated milk and keeping the mixture at about 5° C. (about 41° F.) for about 15-24 hours. A sweetened milk product was made by first combining the reduced-lactose evaporated milk, sucrose, corn syrup, and invert syrup in the amounts listed in Table 2. The mixture was then cooked to remove about 39% of the total weight of the mixture. The resulting sweetened milk product had a sugar content of about 70 degrees Brix.

TABLE 2

Sweetened Milk Product Ingredients for Inventive Examples 1, 4, and 5

| Ingredient | wt % |
|---|---|
| Reduced-lactose evaporated milk | 72.5 |
| Sucrose | 11.5 |
| Corn syrup | 11.5 |
| Invert syrup | 4.6 |

The resulting sweetened milk product was combined with butter, cocoa powder, corn syrup, glycerol, and the clean label preservative dissolved in the water in the amounts listed in Table 3. The mixture was heated to a simmer and was simmered with stirring for at least 10 minutes until a sugar content of less than about 87 degrees Brix was reached. The resulting product was removed from the heat and formed into balls as Inventive Example 1 (IE1), a shelf-stable high water activity confectionery product.

TABLE 3

Inventive Example 1 Ingredients

| Ingredient | wt % |
|---|---|
| Sweetened milk product | 50.9 |
| Butter | 11.2 |
| Cocoa powder | 4.5 |
| Corn syrup | 21.6 |
| Glycerol | 4.4 |
| Clean label preservative | 1.4 |
| Water | 6.0 |

Figure 2:
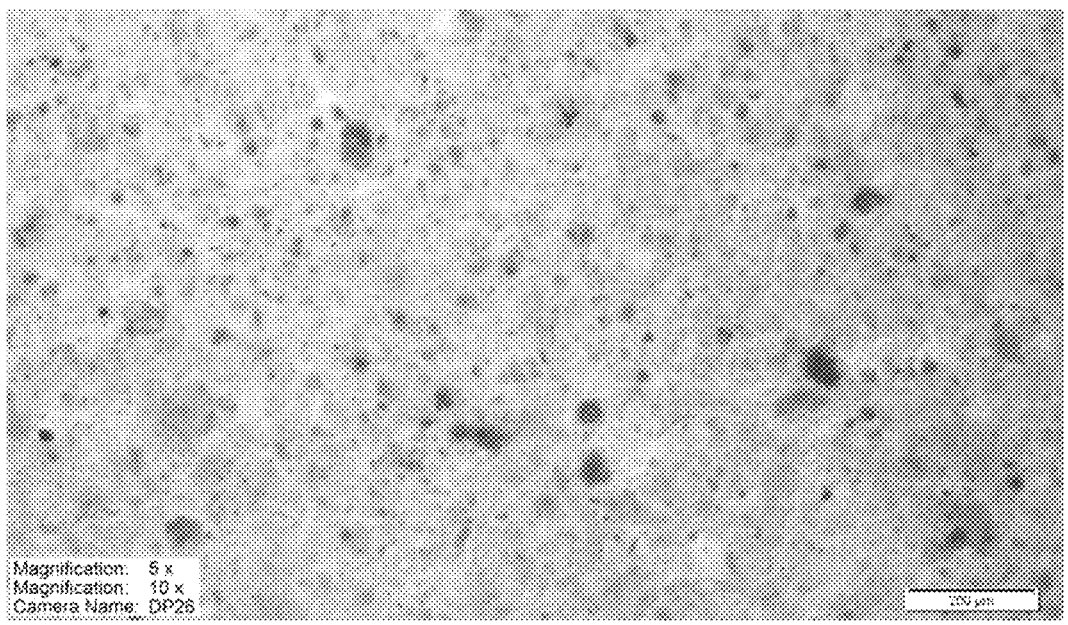
FIG. 2 shows an image of a sample of Inventive Example 1 at nine months after formation.

One set of samples of Inventive Example 1 was packaged and stored in a nitrogen-purged high-moisture barrier plastic. Another set of samples of Inventive Example 1 was packaged and stored in a high moisture barrier plastic without nitrogen purging. A third set of samples of Inventive Example 1 was packaged and stored in a low-moisture barrier plastic without nitrogen purging. Samples of Inventive Example 1 were stored at room temperature for more than a year. Inventive Example 1 had a shelf life of at least nine months. Inventive Example 1 was imaged under 10× magnification at 8 weeks and at 4, 5, 6, and 9 months and contained no observable crystals in the sample, as shown in FIG. 2. Inventive Example 1 was tested for mold and yeast at 0, 4, 8, and 12 weeks and at 4, 6, 7, 8, 9, and 12 months, with less than 10 colony-forming units per gram (cfu/g) of both mold and yeast being detected in each of the samples.

Inventive Example 2

A sweetened milk product was made by first combining lactose-free whole milk powder, water, sucrose, inulin, and invert syrup in the amounts listed in Table 4. The mixture was then cooked to remove about 13% of the total weight of the mixture, thereby forming the sweetened milk product.

TABLE 4

Sweetened Milk Product
Ingredients for Inventive Examples 2 and 3

| Ingredient | wt % |
| --- | --- |
| Lactose-free whole milk powder | 25.4 |
| Water | 34.6 |
| Sucrose | 16.6 |
| Inulin | 16.6 |
| Invert syrup | 6.7 |

The resulting sweetened milk product was combined with butter, cocoa powder, inulin, glycerol, and the clean label preservative dissolved in the water in the amounts listed in Table 5. The mixture was heated to a simmer and was simmered with stirring for at least 10 minutes until a sugar content of less than about 87 degrees Brix was reached. The resulting product was removed from the heat and formed into balls as Inventive Example 2 (IE2), a shelf-stable high water activity confectionery product.

TABLE 5

Inventive Example 2 Ingredients

| Ingredient | wt % |
| --- | --- |
| Sweetened milk product | 50.9 |
| Butter | 11.2 |
| Cocoa powder | 4.5 |
| Inulin | 21.6 |
| Glycerol | 4.4 |
| Clean label preservative | 1.4 |
| Water | 6.0 |

Inventive Example 2 had a similar texture to Inventive Example 1.

Inventive Example 3

A sweetened milk product was made by first combining whole milk powder, water, sucrose, inulin, and invert syrup in the amounts listed in Table 4. The mixture was then cooked to remove about 13% of the total weight of the mixture, thereby forming the sweetened milk product.

The resulting sweetened milk product was combined with butter, cocoa powder, tapioca syrup, glycerol, starch, and the clean label preservative dissolved in the water in the amounts listed in Table 6. The mixture was heated to a simmer and was simmered with stirring for at least 10 minutes until a sugar content of less than about 87 degrees Brix was reached. The resulting product was removed from the heat and formed into balls as Inventive Example 3 (IE3), a shelf-stable high water activity confectionery product.

TABLE 6

Inventive Example 3 Ingredients

| Ingredient | wt % |
| --- | --- |
| Sweetened milk product | 59.7 |
| Butter | 5.0 |
| Cocoa powder | 2.5 |
| Tapioca syrup | 25.0 |
| Starch | 0.5 |
| Clean label preservative | 1.4 |
| Water | 6.0 |

Inventive Example 3 had the best texture of the Inventive Examples based on the results of a sensory descriptive test on the textures. Based on the sensory model, the descriptive sensory results were inputted to get a creaminess score of 8.8 for Inventive Example 3. For comparison, a commercial brigadeiro sample received a creaminess score of only 4.7.

Inventive Example 4

A reduced-lactose evaporated milk was prepared by combining about 0.4 wt % of a lactase enzyme with evaporated milk and keeping the mixture at about 5° C. (about 41° F.) for about 15-24 hours. A sweetened milk product was made by first combining the reduced-lactose evaporated milk, sucrose, corn syrup, and invert syrup in the amounts listed in Table 2. The mixture was then cooked to remove about 39% of the total weight of the mixture, thereby forming the sweetened milk product.

The resulting sweetened milk product was combined with butter, cocoa powder, corn syrup, glycerol, maltodextrin, and the clean label preservative dissolved in the water in the amounts listed in Table 7. The mixture was heated to a simmer and was simmered with stirring for at least 10 minutes until a sugar content of less than about 87 degrees Brix was reached. The resulting product was removed from the heat and formed into balls as Inventive Example 4 (IE4), a shelf-stable high water activity confectionery product.

TABLE 7

Inventive Example 4 Ingredients

| Ingredient | wt % |
| --- | --- |
| Sweetened milk product | 50.6 |
| Butter | 11.2 |
| Cocoa powder | 4.5 |
| Corn syrup | 21.5 |
| Glycerol | 4.4 |
| Maltodextrin | 0.5 |
| Clean label preservative | 1.4 |
| Water | 6.0 |

Inventive Example 4 had a similar texture to Inventive Example 1.

Inventive Example 5

A reduced-lactose evaporated milk was prepared by combining about 0.4 wt % of a lactase enzyme with evaporated milk and keeping the mixture at about 5° C. (about 41° F.) for about 15-24 hours. A sweetened milk product was made by first combining the reduced-lactose evaporated milk, sucrose, corn syrup, and invert syrup in the amounts listed in Table 4. The mixture was then cooked to remove about 39% of the total weight of the mixture, thereby forming the sweetened milk product.

The resulting sweetened milk product was combined with butter, pear puree, inulin, glycerol, and the clean label preservative in the water in the amounts listed in Table 8. The mixture was heated to a simmer and was simmered with stirring for at least 10 minutes until a sugar content of less than about 87 degrees Brix was reached. The resulting product was removed from the heat and formed into balls as Inventive Example 5 (IE5), a shelf-stable high water activity confectionery product.

TABLE 8

Inventive Example 5 Ingredients

| Ingredient | wt % |
| --- | --- |
| Sweetened milk product | 50.9 |
| Butter | 11.2 |
| Pear puree | 4.5 |
| Inulin | 21.6 |
| Glycerol | 4.4 |
| Clean label preservative | 1.4 |
| Water | 6.0 |

Inventive Example 5 had a similar texture to Inventive Example 1.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process of forming a confectionery product comprising:
    forming a confectionery mixture comprising about 50% to about 60% of a sweetened milk product, 4% to 16% of a fat, and 2% to 16% of a flavoring, by weight of the confectionery mixture;
    heating the confectionery mixture while stirring until the confectionery mixture reaches a predetermined consistency; and
    forming the confectionery product upon cooling of the confectionery mixture;
    wherein the confectionery product has a water activity of about 0.59 or greater, has a sugar content of about 87 degrees Brix or less, and is shelf-stable without refrigeration for at least three months.

2. The process of claim 1, wherein the sweetened milk product has a reduced lactose content.

3. The process of claim 1 further comprising adding a lactase enzyme to sweetened condensed milk to form the sweetened milk product.

4. The process of claim 1 further comprising adding a lactase enzyme to evaporated milk to form a reduced-lactose milk product and adding at least one sweetener to the reduced-lactose milk product to form the sweetened milk product.

5. The process of claim 4, wherein the sweetener is selected from the group consisting of corn syrup, sucrose, invert sugar, inulin, tapioca syrup, agave syrup, rice syrup, and combinations thereof.

6. The process of claim 1 further comprising adding water and at least one sweetener to a reduced-lactose milk powder to form the sweetened milk product.

7. The process of claim 6, wherein the sweetener is selected from the group consisting of corn syrup, sucrose, invert sugar, inulin, and combinations thereof.

8. The process of claim 1, wherein the flavoring is selected from the group consisting of cocoa powder, fruit puree, pear puree, mango puree, peanut butter, peanut flour, chocolate, and combinations thereof.

9. The process of claim 1, wherein the confectionery mixture further comprises at least one additive.

10. The process of claim 9, wherein the additive is selected from the group consisting of corn syrup, inulin, glycerol, maltodextrin, milk protein isolate, sodium caseinate, anhydrous milk fat, and combinations thereof.

11. The process of claim 1 further comprises mixing the confectionery mixture with at least one preservative after heating the confectionery mixture.

12. The process of claim 11, wherein the preservative is a clean label preservative.

13. The process of claim 1 further comprising applying a coating to an outer surface of the confectionery product.

14. The process of claim 13, wherein the coating is selected from the group consisting of an edible film, solid bits, and a combination thereof.

15. The process of claim 1, wherein the confectionery product contains no observable crystals at 10× after 8 weeks at room temperature.

16. The process of claim 15, wherein the confectionery product contains no observable crystals at 10× after 4 months at room temperature.

17. A process of forming a confectionery product comprising:
    providing a reduced lactose sweetened milk product having a solids content between 70% and 90% by weight;
    forming a confectionery mixture comprising mixing the reduced lactose sweetened milk product, 4% to 16% of a fat, 2% to 16% of a flavoring, and between 15% to 40% liquid sweetener, all by weight of the formed confectionery mixture, wherein the reduced lactose sweetened milk product is present in an amount greater than any other ingredient;
    heating the confectionery mixture while stirring until the confectionery mixture reaches a predetermined consistency; and
    forming the confectionery product upon cooling of the confectionery mixture;
    wherein the confectionery product has a water activity of about 0.59 or greater, has a sugar content of about 87 degrees Brix or less, is shelf-stable without refrigeration for at least three months, and contains no observable crystals at 10× magnification after 8 weeks at room temperature.

18. A confectionery product formed by the process of claim 1.

\* \* \* \* \*